UNITED STATES PATENT OFFICE.

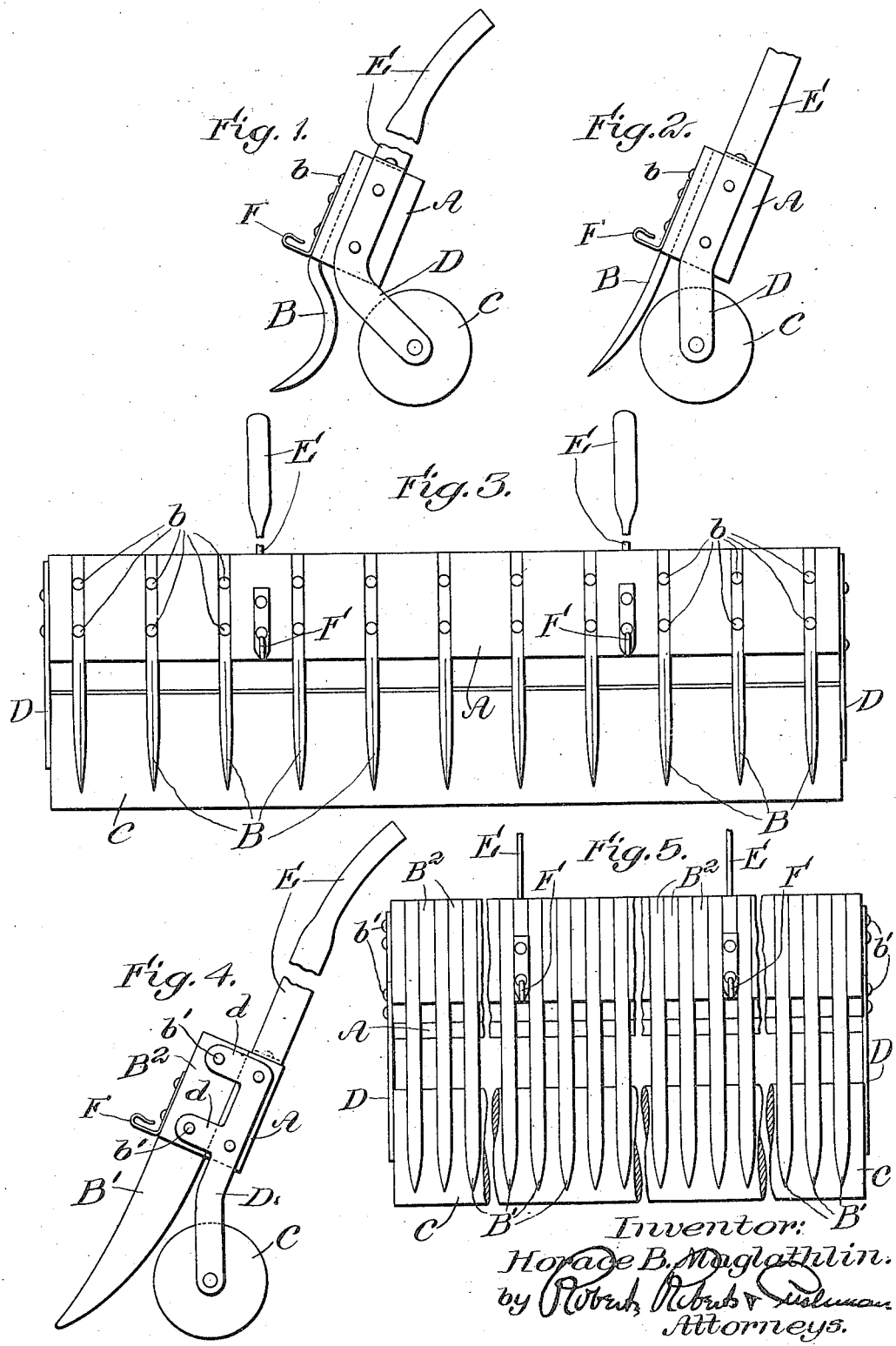

HORACE B. MAGLATHLIN, OF KINGSTON, MASSACHUSETTS, ASSIGNOR, BY DIRECT AND MESNE ASSIGNMENTS, TO CRANBERRY HARVESTER COMPANY, OF BOSTON, MASSACHUSETTS, A CORPORATION OF MASSACHUSETTS.

CULTIVATOR.

1,233,090.            Specification of Letters Patent.        Patented July 10, 1917.

Application filed November 16, 1916. Serial No. 131,782.

*To all whom it may concern:*

Be it known that I, HORACE B. MAGLATHLIN, a citizen of the United States, and resident of Kingston, in the county of Plymouth and State of Massachusetts, have invented new and useful Improvements in Cultivators, of which the following is a specification.

This invention relates to cultivating apparatus, and more particularly to apparatus for pruning and raking cranberry plants.

In the accompanying drawings which illustrate certain embodiments of the invention, Figure 1 is a side or end elevation of an exemplification of the invention, adapted for pruning;

Fig. 2 is a similar view of a modified form of pruning apparatus;

Fig. 3 is a front elevation of the apparatus shown in either of Figs. 1 or 2;

Fig. 4 is a side or end elevation of an exemplification of the invention adapted for raking; and Fig. 5 is a front elevation, partly broken away, of the rake shown in Fig. 4.

Cranberry plants which are tough, wiry vines, varying from a few inches to several feet in length, as grown on a field or bog, become so entangled and intertwined and so densely matted that it has not heretofore been practicable to cut or prune them, nor to rake them, by any of the usual agricultural machines drawn by horse power or mechanical power, for the reason that power-drawn knives or rakes of ordinary construction cannot pass through the entangled mass without injuring the vines and tearing up roots. The vines are therefore pruned and raked by hand, a very slow and costly process, materially increasing the cost of the product, and if not properly done seriously injuring the crop and plants. The object of the present invention is to provide appliances adapted to be drawn either by horses or mechanical tractors for quickly, economically and properly pruning and raking a bog of cranberry vines without injuring the plants.

Referring first to Figs. 1, 2 and 3, A represents a cross head, which may be in the form of a beam, and B, B, represent a series of metal blades secured to the front side of the cross head, suitably spaced apart, and extending downward from the cross head with a slight forward inclination. The blades B may be set into grooves in the cross head and secured by bolts or screws $b$, or in any other convenient manner.

When the apparatus is to be used for pruning, the blades B will be sharpened to a knife edge along their front sides, and they may be curved as shown in Fig. 1 or substantially straight as shown in Fig. 2. A roller C is positioned below and behind the extremities of the blades, and journaled at its ends on a pair of downwardly extending brackets D secured at the ends of the cross head A. E, E, represent handles extending upwardly and rearwardly from the cross head, by which the apparatus is guided and controlled. A pair of hooks F, F, are secured to the front of the cross head, to which traces or other draft rigging is attached. The apparatus will be best balanced if the hooks F, F, are so located that the draft will be applied approximately at the junction of the blades and cross head.

In operation the apparatus is held by the handles E in substantially the position shown, resting on the roller C, which supports the blades clear of the ground. As the device is drawn forward the blades penetrate the entangled mass of vines, and the roller bears on the plants and firmly holds them near the roots by pressure on the earth, while the cutting edges of the blades are drawn through them. This results in cutting a certain proportion of the vines and thinning them out with substantial uniformity throughout the area treated. The percentage of the plants so pruned or cut may be varied by varying the spacing of the blades. The roller pressing down upon the vines with the weight of the device together with the added pressure caused by the downward pull of the vines upon the blades holds the vines sufficiently firmly to prevent them from being uprooted by the pull of the blades passing through the entangled mass, and to insure their being cut clean.

In the embodiment of the invention shown in Figs. 4 and 5, the cross head or beam A, bracket D, roller C, handles E and hooks F, are substantially similar to corresponding parts in the other figures. The blades B', however, instead of being cutting blades are blunt edged raking blades, preferably made of wood, and arranged closer together than the cutting blades in order the more thoroughly to rake the vines. The rake structure is built up of alternately arranged blades B' and spacing blocks B², the whole bound together by one or more rods b' extending through the bases of the blades and the spacing blocks. This composite structure is secured to the front side of the cross head A and secured thereto in any suitable manner as by cleats d, d, extending forward from the bracket D.

The operation of the apparatus for raking is substantially the same as that of the cutting or pruning device, save that instead of cutting through the entangled vines the blades rake or comb through them, thus removing any loose material mingled with the plants, while the pressure of the roller on the vines securely holds them from being uprooted by the pull of the blades.

The two forms of the appliance may be used independently, in which case the pruning device will first be run over the field, and the plants cut off may then be raked out by the raking device. Or the two could be attached to a single carriage with the raking device following the pruning device, in which case the work of pruning and raking could be accomplished at the same time, thus avoiding the necessity of going over the ground twice.

I claim:

1. In apparatus of the character described the combination of a frame, an elongated roller journaled in the frame to move along over the surface of the ground and a series of elongate blades extending downwardly in front of the roller in close proximity to the roller, whereby rooted plants engaged by the blades will be prevented from being uprooted by the roller bearing thereupon in the rear of the blades.

2. An apparatus of the character described comprising a cross head, a series of cutting blades secured thereto, and a roller positioned close behind said blades, and extending below the lower extremities thereof so as to bear upon plants while they are engaged by said blades.

3. An apparatus of the character described comprising a cross head, a series of cutting blades secured thereto, downwardly extending brackets at each end of the cross head, and a roller journaled on said brackets and positioned close behind said blades, and extending below the lower extremities thereof so as to bear upon plants while they are engaged by said blades.

4. An apparatus of the character described comprising a cross head, a series of cutting blades secured thereto, downwardly extending brackets at each end of the cross head, and a roller journaled on said brackets and positioned below and close behind said blades and extending below the lower extremities thereof so as to bear upon plants while they are engaged by said blades and to support said blades clear of the ground.

5. An apparatus of the character described comprising a cross head, a series of cutting blades secured thereto, a roller positioned behind said blades and extending below the lower extremities thereof so as to bear upon plants while they are engaged by said blades, and a handle secured to said cross head.

6. Pruning apparatus adapted to be moved along the ground to prune rooted plants comprising a frame, a roller extending transversely of the frame in proximity to the ground, and elongate cutting blades extending downwardly and forwardly immediately in front of the roller with their cutting edges directed forwardly, so that as the apparatus is moved along the surface of the ground to cause the cutting blades to engage plants the roller bears upon the lower extremities of the plants to restrain them from being uprooted by the cutting blades.

7. An apparatus of the character described comprising a frame, a series of pointed cutting blades mounted on the frame so as to extend downwardly and forwardly into proximity to the ground with their cutting edges directed forwardly, and a roller journaled in the frame to extend along the series of blades immediately therebehind so as to bear upon the lower extremities of plants while their upper portions are being severed by the cutting blades.

8. Vine-cutting apparatus comprising a frame, a series of cutting blades extending downwardly from the frame with their cutting edges directed forwardly, the cutting blades curving forwardly, and an elongate roller journaled in the frame to bear on the vines close behind the cutting blades so as to restrain the vines from being uprooted by the cutting blades.

Signed by me at Boston, Massachusetts, this thirteenth day of November, 1916.

HORACE B. MAGLATHLIN.

Copies of this patent may be obtained for five cents each, by addressing the "Commissioner of Patents, Washington, D. C."